US006765199B2

(12) United States Patent
Youngquist et al.

(10) Patent No.: US 6,765,199 B2
(45) Date of Patent: Jul. 20, 2004

(54) TIME-DEPENDENT DIGITAL SIGNAL SCALING PROCESS

(75) Inventors: Michael G. Youngquist, Palo Alto, CA (US); Edward Gavin, San Jose, CA (US); William E. Rich, Redwood Shores, CA (US)

(73) Assignee: Ciphergen Biosystems, Inc., Fremont, CA (US)

( * ) Notice: Subject to any disclaimer, the term of this patent is extended or adjusted under 35 U.S.C. 154(b) by 55 days.

(21) Appl. No.: 10/193,349

(22) Filed: Jul. 10, 2002

(65) Prior Publication Data

US 2003/0057370 A1 Mar. 27, 2003

Related U.S. Application Data

(60) Provisional application No. 60/305,427, filed on Jul. 13, 2001.

(51) Int. Cl.[7] .......................... H01J 49/40; H01J 49/26; A01J 49/40; B01D 59/44

(52) U.S. Cl. ....................... 250/287; 250/286; 250/281; 250/282; 250/423 R

(58) Field of Search ................................ 250/286, 287, 250/288, 281, 282, 423 R, 440.11, 442.11

(56) References Cited

U.S. PATENT DOCUMENTS

| | | | | | |
|---|---|---|---|---|---|
| 4,546,355 | A | | 10/1985 | Boles | |
| 4,694,300 | A | | 9/1987 | McRoberts et al. | |
| 4,733,073 | A | | 3/1988 | Becker et al. | |
| 5,594,243 | A | | 1/1997 | Weinberger et al. | |
| 5,619,034 | A | * | 4/1997 | Reed et al. | 250/287 |
| 6,080,985 | A | | 6/2000 | Welkie et al. | |
| 6,580,071 | B2 | * | 6/2003 | Weinberger et al. | 250/287 |
| 6,586,728 | B1 | * | 7/2003 | Gavin et al. | 250/287 |
| 6,590,204 | B2 | * | 7/2003 | Baranov | 250/282 |
| 2001/0054686 | A1 | * | 12/2001 | Torti et al. | 250/288 |
| 2002/0024009 | A1 | * | 2/2002 | Baranov | 250/282 |
| 2003/0057370 | A1 | * | 3/2003 | Youngquist et al. | 250/287 |

OTHER PUBLICATIONS

U.S. patent application Ser. No. 09/569,158, Gavin et al., filed May 11, 2000.

Raznikov et al., "New Approaches to Transformation and Analysis of Mass–Spectrometric and Chromatographic/Mass–Spectrometric Information," *Appl. Energy: Russian Journal Of Fuel, Power and Heat Systems*, vol. 35, No. 1, pp. 71–86, (1997).

Bromba et al., "Application Hints For Savitzky–Golay Digital Smoothing Filters," *Analytical Chemistry*, vol. 53, No. 11, pp. 1583–1586, American Chemical Society, Columbus, US, (Sep. 1, 1981).

Biermann et al., "Properties of a Variable Digital Filter for Smoothing and Resolution Enhancement," *Analytical Chemistry*, vol. 58, pp. 536–539, (1986).

Bromba et al., "Variable Filter for Digital Smoothing and Resolution Enhancement of Noisy Spectre," *Analytical Chemistry*, vol. 56, pp. 2052–2058, (1984).

Hedfjaell et al., "Computerized Fast–Scanning Gas Chromatograph–Mass Spectrometer," *Analytical Chemistry*, vol. 47, No. 4, pp. 666–670, American Chemical Society, Columbus, US, (Feb. 1975).

Geno et al., "Secondary Electron Emission Induced by Impact of Low–Velocity Molecular Ions on a Microchannel Plate," *International Journal of Mass Spectrometry and Ion Processes*, vol. 92, pp. 195–210, (1989).

* cited by examiner

*Primary Examiner*—John R. Lee
*Assistant Examiner*—Bernard Souw
(74) *Attorney, Agent, or Firm*—Townsend and Townsend and Crew LLP

(57) ABSTRACT

A method for processing time-dependent signal data is disclosed. The time-dependent signal data are received in a memory, wherein the time-dependent signal data represent a time-dependent signal, and wherein the time-dependent signal data include representations of time-of-flight values of ions, or values derived from time-of-flight values of ions. The time-dependent signal data are scaled with a time-dependent scaling function.

49 Claims, 4 Drawing Sheets

TIME-DEPENDENT DIGITAL SIGNAL SCALING PROCESS

CROSS-REFERENCES TO RELATED APPLICATIONS

This application claims priority from provisional application No. 60/305,427, filed Jul. 13, 2001, the disclosure of which is incorporated herein by reference in its entirety for all purposes.

BACKGROUND OF THE INVENTION

Time-of-flight mass spectrometry (TOFMS) is an analytical process that determines the mass-to-charge ratio (m/z) of an ion by measuring the time it takes a given ion to travel a fixed distance after being accelerated to a constant final velocity. There are two fundamental types of time-of-flight mass spectrometers: those that accelerate ions to a constant final momentum and those that accelerate ions to a constant final energy. Because of various fundamental performance parameters, constant energy TOF systems are preferred.

A previously known constant kinetic energy TOF mass spectrometer is shown in FIG. 1A. Ions are created in a region typically referred to as the ion source. Two ions with masses M1 and M2 have been created as shown in FIG. 1A. A uniform electrostatic field created by the potential difference between repeller lens 10 and ground aperture 11 accelerates ions M1 and M2 through a distance s. After acceleration, ions pass through ground aperture 11 and enter an ion drift region where they travel a distance x at a constant final velocity prior to striking ion detector 12.

The time-of-flight of the ions can be measured to calculate their mass-to-charge ratio values. For example, referring to FIG. 1A, within the ion optic assembly, accelerating electrical field (E) is taken to be the potential difference (V) between the two lens elements (10 and 11) as applied over acceleration distance s, (E=V/s). Equation (1) defines the final velocity (v) for ion $M_1$ with charge z. The final velocity of ion $M_2$ is determined in a similar manner.

$$v = \left(\frac{2sEz}{M_1}\right)^{1/2} \tag{1}$$

Inverting equation (1) and integrating with respect to distance s yields equation (2), which describes the time spent by ion $M_1$ in the acceleration region ($t_s$)

$$t_s = \left(\frac{M_1}{2Esz}\right)^{1/2}(2s) \tag{2}$$

The total time-of-flight for ion $M_1$ ($t_1$) is then derived by adding $t_s$ to the time spent during flight along distance x (the ion drift region). Time $t_s$ equals the product of the length of free flight distance x with 1/v, as shown in Equation (3).

$$t_t = \left(\frac{M_1}{2Esz}\right)^{\frac{1}{2}}(2s + x)^2 \tag{3}$$

Rearranging equation (3) in terms of $M_1/z$ yields equation (4)

$$\frac{M_1}{z} = \frac{2t_t^2 Es}{(2s + x)^2} \tag{4}$$

For all TOFMS systems, E, s, and x are intentionally held constant during analysis, thus equation (4) can be reduced to equation (5).

$$\frac{M_1}{z} = kt_t^2 \tag{5}$$

Equations (1)–(5) simplify the TOFMS process by assuming that all ions are created at the same time, within the same location, and have no initial velocity prior to acceleration. Routinely, this is not the case and in many instances, variations in formation time, original location, and initial velocity (also referred to as initial energy) are often demonstrated for various ions of a given m/z population. Such variation ultimately limits the mass resolving power of the instrument. Mass resolving power is typically defined as the ability to determine subtle differences in m/z.

For a TOFMS system, mass resolving power R is mathematically defined by equation (6), where dm and dt are the respective full mass or full temporal width of a measured signal at its half magnitude.

$$R = \frac{m}{dm} = \frac{T}{2dt} \tag{6}$$

Ultimately, factors that limit mass resolving power are dictated by the ionization means, geometry of the ionization source, geometry and stability of the TOF mass spectrometer, as well as the nature of the sample itself. Various strategies have been adapted to improve mass resolving power in time-of-flight mass spectrometry.

Another example of a TOF mass spectrometer is shown in FIG. 1B. The TOF mass spectrometer shown in FIG. 1B is an orthogonal extraction device. In the device, ions are generated from ion source 20 and directed to repeller lens 22 via RF ion guide 21. A uniform electrostatic field created between repeller lens 22, extractor lenses 29, and ground apertures 28 accelerate ions. After acceleration, ions pass through ground apertures 28 and enter an ion drift region along path 35 where they travel through reflectron 27. Reflectron 27 functions to narrow ion energy spread, and then it redirects the ions to detector 26.

The output signal of ion detector 26 can be an analog signal, which is then converted to a digital signal. The analog-to-digital conversion may be accomplished, for example, using a time-interval recording device, such as a time-to-digital converter (TDC). For instance, detector 26 outputs a signal to high speed time-to-digital converter (TDC) 24 when an ion impacts its detecting surface. TDC 24 converts analog signals from detector 26 to digital information suitable for software processing at stage 25. TDC 24 records a single impulse when the detector 26 output signal exceeds a predetermined threshold. HV pulser 23 indicates to TDC 24 the start of an ion detection cycle when the repeller lens 22 starts to accelerate the ions.

Previously known systems have employed means for providing gain in the output signal of detector 26 prior to digitization. Such gain has been provided by primary ion to secondary product or primary ion to secondary electron conversion prior to striking an electromissive detector surface. Primary ions are converted to secondary products through the mechanisms of surface induced dissociation, generating ion and neutral fragments, and/or fast ion bombardment of solid surfaces, creating sputtered products. Primary ions can also be converted to secondary electrons by directing them to strike a metal of low work potential, ultimately releasing low energy electrons. These secondary products are then directed to strike an electromissive device, creating an amplification cascade provided by the generation of secondary, tertiary, quaternary, etc. electrons.

The probability of producing an output signal from the detector 26 decreases with increasing time-of-flight (and also increasing m/z values). As shown in FIG. 2 as ion m/z increases, the ion-to-electron conversion probability decreases.

Ions are more likely to be detected by a detector if they have high velocities. Ions with high m/z values have greater mass and have lower velocities than ions with low m/z values. Consequently, ions with high m/z values have a lower probability of generating secondary charged particles such as electrons in the detector and have a lower probability of being detected by the detector than ions with low m/z values. For example, FIG. 2 depicts the ion to electron conversion probability for ions of various mass-to-charge ratio values (m/z) at two different kinetic energy levels: 50 KeV (line 30) and 25 KeV (line 31). As shown in FIG. 2, the ions with higher kinetic energy (line 30) are more likely to produce electrons than ions with low kinetic energy (line 31).

Also, ions are less likely to arrive at the detector if they remain in flight for longer periods of time. Ions with high m/z values have a higher mass and take a longer time to arrive at the detector than ions with low m/z values. Because ions with high m/z values remain in flight longer than ions with low m/z values, there is an increased chance that the ions may not arrive at the detector. Accordingly, the probability of transporting ions to the detector decreases as the m/z value of an ion increases. The decreased probability often results in shorter peaks in the mass spectrum signal at high m/z values than would be the case if all ions had the same chance of reaching the detector.

Furthermore, in TOF mass spectra, empirical data indicate that peaks tend to widen with increasing with time-of-flight values (and m/z values). A number of factors can contribute to increasing peak widths including differences in the initial velocity of the ions of a given m/z value, differences in the initial spatial distributions of the ions, slight differences in the chemical composition of the analytes, etc. As ions are in flight for longer periods of time, it is believed that factors such as initial velocity distributions can become more pronounced resulting in wider time-of-flight distributions in the mass spectrum signal. If left uncorrected, the resulting peaks in the mass spectrum signal are shorter and wider at the end of the mass spectrum signal than at the beginning of the mass spectrum signal, even though the areas of all peaks may indicate that substantially the same number of analyte ions were detected for each of the peaks.

In sum, the peaks in the mass spectrum can be short and wide at high m/z values, and tall and thin at low m/z values. This visual distribution of peak shapes can be problematic as one of the crucial steps in analyzing a mass spectrum signal is identifying peaks of potential analyte ions in the mass spectrum signal. The thinner, longer peaks at the beginning of the mass spectrum signal tend to dominate the visual presentation of the mass spectrum signal and the viewer's eyes. The visual presentation gives the impression that the peaks at higher m/z values are not present even though the areas of those peaks would show that the ions forming those peaks were detected in substantially equal number as the ions forming the longer, thinner peaks at the beginning of the mass spectrum signal. It is possible that some peaks, and consequently some analytes at high m/z values may not be identified.

Even a "peak picking" algorithm may not be able to identify the shorter, wider peaks at the end of the mass spectrum signal. A "peak picking" algorithm can automatically identify peaks in a mass spectrum signal using predetermined criteria such as a minimum signal-to-noise ratio. The shorter, wider peaks can blend with noise thus making it difficult for a peak picking algorithm to find peaks of potential significance. Automated peak picking algorithms are desirable, but optimization of the algorithms, for example, to function well both for high intensity, narrow peaks at short time-of-flight values and low-intensity broad peaks at long time-of-flight values is difficult.

In view of these problems, it would be desirable to produce mass spectrum signal data with more clearly defined peaks, especially at high m/z values so that the peaks can be identified more easily by a user or an algorithm.

Embodiments of the invention address these and other problems.

SUMMARY OF THE INVENTION

Embodiments of the invention are directed to methods for processing a signal that is indicative of the mass-to-charge ratio values of ions from a detector. Other embodiments of the invention are directed to computer readable media and mass spectrometers.

One embodiment of the invention is directed to a method for digitally processing time-dependent signal data, the method comprising: (a) receiving the time-dependent signal data in memory, wherein the time-dependent signal data represent a time-dependent signal, and wherein the time-dependent signal data include representations of time-of-flight values of ions, or values derived from time-of-flight values of ions; and (b) scaling the time-dependent signal data with a time-dependent scaling function.

Another embodiment of the invention is directed to a computer readable medium comprising: (a) code for receiving time-dependent signal data in memory, wherein the time-dependent signal data represent a time-dependent signal, and wherein the time-dependent signal data include representations of time-of-flight values of ions, or values derived from time-of-flight values of ions; and (b) code for scaling the time-dependent signal data with a time-dependent scaling function.

Another embodiment of the invention is directed to a mass spectrometer system comprising: (a) an ionization source that generates ions; (b) a mass analyzer that receives the ions from the ionization source, and focuses and accelerates the ions using electrostatic fields toward an ion detector; (c) an ion detector with a detecting surface that detects the ions and produces a time-dependent signal; (d) a digital converter adapted to convert the time-dependent signal from the ion detector into time-dependent signal data; (e) a digital computer including a memory, the digital computer configured to process the time-dependent signal data according to the steps of (i) receiving the time-dependent signal data in the memory, wherein time-dependent signal includes representations of the time-of-flight values of the ions, or values derived from time-of-flight values of the ions, and (ii) scaling the time-dependent signal data with a time-dependent scaling function.

These and other embodiments of the invention are described in further detail below.

BRIEF DESCRIPTION OF THE DRAWINGS

FIG. 5(*b*) shows the signal shown in FIG. 5(*a*) after a time-dependent scaling function is applied to the signal.

FIG. 5(*c*) shows the signal in FIG. 5(*a*) after a time-dependent Gaussian filter function is applied to the signal.

FIG. 5(*d*) shows the signal in FIG. 5(*a*) after a time-dependent scaling function and a time-dependent Gaussian filter function is applied to the signal.

DETAILED DESCRIPTION

As noted above, the overall detection efficiency for ions in a typical time-of-flight mass spectrometer generally decreases as the molecular weight of the ions increase. Consequently, a given population of low molecular weight ions produces stronger detection signals when compared to an identical number of higher molecular weight ions. Also, as noted above, the probability that ions will arrive at a detector decreases with increasing m/z values. In addition to these problems, there is a significant amount of noise in raw mass spectrum signal data that can obscure analyte ion peaks.

It would be desirable to provide for a scaling and filtering scheme that scales and preferably filters a signal at various mass-to-charge ratio values (m/z) in TOFMS. For low m/z ions, ion-to-electron conversion efficiency and the probability of arrival at the detector are high, thus diminishing the need for significant additional peak scaling. For high m/z ions, ion-to-electron conversion efficiency and the probability of arrival at the detector are low, thus creating a need for further signal scaling. Furthermore, if mass resolving power for low molecular weight ions is to be preserved, any attendant scaling is desirably achieved without diminishing any required frequency response. Signal data scaling preferably takes place without undue scaling of extraneous high frequency noise.

Embodiments of the invention address these concerns. One embodiment of the invention is directed to a method for digitally processing time-dependent signal data. The method comprises receiving the time-dependent signal data in memory. The time-dependent signal data can represent a time-dependent signal. The time-dependent signal data include representations of time-of-flight values of ions, or values derived from time-of-flight values of ions. After the time-dependent signal data are received, it is scaled with a time-dependent scaling function.

"Values derived from time-of-flight values" include any higher order values that originate from time-of-flight values. For example, as noted above, a mass-to-charge ratio value is a value that is derived from a time-of-flight value.

Also, in discussing some embodiments of the invention, "m/z values" are often used to illustrate specific examples. It is understood that other values that are proportional to m/z values, such as time-of-flight values, can be used in place of m/z values in any of the specifically described invention embodiments (and vice-versa). For instance, specific examples discussed below describe scaling peaks at specific m/z values. Alternatively, peaks can be scaled at one or more time-of-flight values.

I. Obtaining Digital Signal Data

Figure 3:
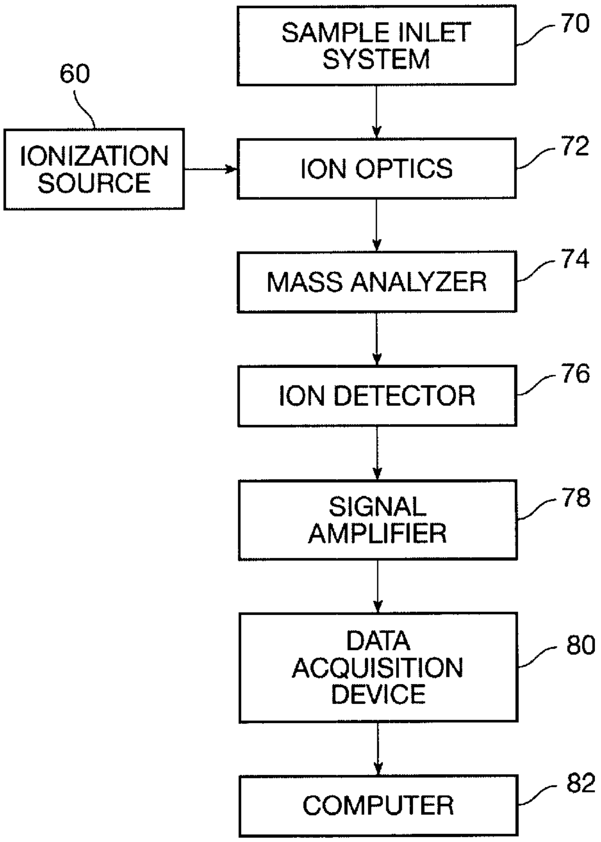
FIG. 3 is a block diagram of a mass spectrometer according to an embodiment of the invention.

Embodiments of the invention may be used with various mass spectrometers including time-of-flight mass spectrometers (TOFMS) and various TOF tandem hybrid systems such as quadrapole-TOFMS, an ion trap-TOFMS, an electrostatic analyzer-TOFMS, and a TOF-TOF MS. A block diagram of a time-of-flight mass spectrometer is shown in FIG. 3. The mass spectrometer of FIG. 3 may be configured as a parallel extraction device or an orthogonal extraction device.

A sample containing matter that is to be analyzed by the mass spectrometer is introduced through sample inlet system 70. The sample may be introduced as a solid, liquid, or gas. The sample is transferred into ion optics 72. Ionization source 60 causes a portion of the sample to become an ionized gas in ion optics 72. Ionization source 60 may comprise a laser desorption ionization device, a plasma desorption ionization device, a fast atom bombardment ionization device, an electron ionization device, a chemical ionization device, or an electrospray ionization device. A laser desorption device may be used to perform laser desorption/ionization, surface-enhanced laser desorption/ionization, and/or matrix-assisted laser desorption/ionization (MALDI).

Although a laser desorption process is described in detail, any suitable ionization technique can be used in embodiments of the invention. The ionization techniques may use, for example, electron ionization, fast atom/ion bombardment, matrix-assisted laser desorption/ionization (MALDI), surface enhanced laser desorption/ionization, or electrospray ionization. These ionization techniques are well known in the art.

In preferred embodiments, a laser desorption time-of-flight mass spectrometer is used. Laser desorption spectrometry is especially suitable for analyzing high molecular weight substances such as proteins. For example, the practical mass range for a MALDI or a surface enhanced laser desorption/ionization process can be up to 300,000 daltons or more. Moreover, laser desorption processes can be used to analyze complex mixtures and have high sensitivity. In addition, the likelihood of protein fragmentation is lower in a laser desorption process such as a MALDI or a surface enhanced laser desorption/ionization process than in many other mass spectrometry processes. Thus, laser desorption processes can be used to accurately characterize and quantify high molecular weight substances such as proteins.

Surface-enhanced laser desorption/ionization, or SELDI, represents a significant advance over MALDI in terms of specificity, selectivity and sensitivity. SELDI is described in U.S. Pat. No. 5,719,060 (Hutchens and Yip). SELDI is a solid phase method for desorption in which the analyte is presented to the laser while on a surface that enhances analyte capture and/or desorption.

Again referring to FIG. 5, ion optics 72 accelerates ions toward mass analyzer 74. Ion optics 72 may, for example, comprise electrostatic lenses such as a repeller lens and ground aperture as discussed above. Mass analyzer 74 directs the ions to ion detector 76. In a TOF mass spectrometer, the mass analyzer 74 is a free flight region where the ions "fly" after they are accelerated. TOF mass spectrometer analyzers may comprise a linear system, in which ion free-flight occurs with rectilinear motion. Alternatively, the analyzers may include a reflected system, in which ions are turned about in an ion mirror or reflectron by an array of electrostatic sectors. Ion detector 76 may comprise, for example, a microchannel plate detector, multi-stage electron multiplier, or a hybrid combination of these. Ion detector 76 detects ions that impact its detecting surface and passes an output signal indicative of the mass-to-charge ratio of the detected ions to signal amplifier 78.

An optional signal amplifier 78 outputs a signal to the data acquisition device 80, which converts the analog output from the amplifier 78 to digital signal data. The data acquisition device 80 may include any suitable digital converter device that produces digital signal data. Analog-to-digital conversion may be accomplished, for example, using a time-interval recording device, such as a time-to-digital converter, in an orthogonal extraction mass spectrometer. Alternatively, a time array recording device such as a transient recorder or a digital oscilloscope could be used in a parallel extraction mass spectrometer. Data acquisition device 80 then transfers that digital signal data to the computer 82 where the digital signal data are stored. The computer 82 may include a memory (not shown) such as a RAM (random access memory), ROM (read only memory), EPROM (erasable programmable read only memory), etc., The digital signal data may be received and stored in the memory temporarily, permanently, or semi-permanently. After the computer 82 receives the digital signal data, one or more processors (e.g., a microprocessor, a digital signal processor (DSP), etc.) (not shown), and/or hardware circuitry (not shown), in the computer 82 can then digitally process the digital signal data. A computer readable medium such as a magnetic, optical, or electromagnetic information storage medium (e.g., a hard disk drive) in the computer 82 can include any suitable code for directing the processor to process the digital signal data.

II. Processing the Digital Signal Data

Figure 4:
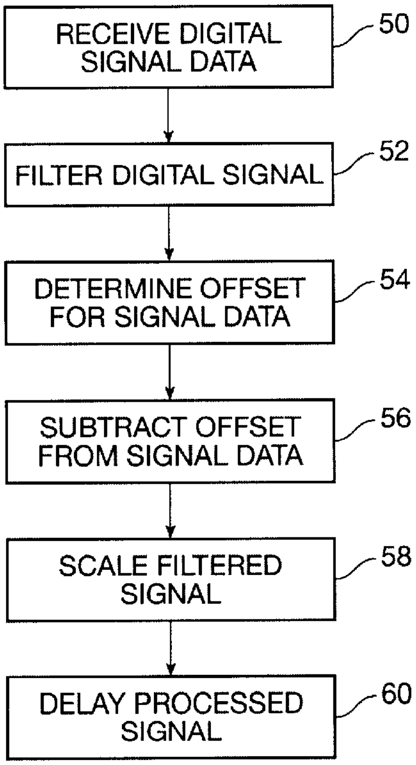
FIG. 4 is a flowchart for a process according to an embodiment of the invention.

After the digital signal data have been received by the digital computer, a process such as the one illustrated in the flowchart shown in FIG. 4 can be performed on the digital signal data. Referring to FIG. 4, digital signal data are first received in memory from, for example, an analog-to-digital converter (step 50) and is then stored in memory. Optionally, the signal data can be filtered (step 52). Then, an offset is calculated for the digital signal data (step 54). Then, the offset can be subtracted from the digital signal data (step 56). After filtering and subtracting the offset, the signal data can be scaled (step 58). After scaling, the processed signal can be displayed (step 60). Each of these steps is described in greater detail below.

Although the previously described steps 52, 54, 56, 58, 60 are shown in a particular order, it is understood that in embodiments of the invention, the steps may be performed in any suitable order to produce processed digital signal data. For example, in some embodiments, any suitable combination of filtering the signal data 52, subtracting the offset from the signal data 56, and scaling the signal data 58 can be performed on each data point in the signal data before processing other data points. Alternatively, one-of-filtering the signal data 52, subtracting the offset from the signal data 56, or scaling the signal data 58 can be performed on all data points in the digital signal data before performing the other steps.

Moreover, although a specific set of steps is shown in FIG. 4, all of the steps need not be performed. For example, in some embodiments, a signal can be filtered with analog circuitry before it is digitized. Thus, in these embodiments, digitally filtering the digital signal data are optional. Additionally, some of the steps, or portions of steps, can be performed by hardware rather than implemented by a processor. For example, a digital filtering circuit can perform the filtering step 52 with filter coefficients, for example, provided by a processor, stored in a memory, etc. Moreover, one or more processors can be used to implement the steps shown in FIG. 4. For example, a digital signal processor (DSP) can be used to implement the filtering the signal data 52, subtracting the offset from the signal data 56, and/or scaling the signal data 58, while a general purpose microprocessor, video processor, or the like, can be used to display the processed signal 60. Therefore, the term "digital computer", as used herein, is intended to include a "computer" having one or more processors, and/or hardware circuitry for processing digital data as described above.

The products of the various processing steps shown in FIG. 4 can be described with reference to FIGS. 5(*a*) to 5(*d*). In each of FIGS. 5(*a*) to 5(*d*), two types of displays are shown. A first type of display 200 is a graph of signal intensity vs. time-of-flight (or m/z). A second type of display 201 is a gray-scale image where signal intensity is represented by a line, a color, or a shade of color. High signal intensities may be represented by a specific color or a specific color intensity.

FIG. 5(*a*) shows digital signal data that have not been filtered or scaled. FIG. 5(*b*) shows the raw digital signal data in FIG. 5(*a*) after it has been scaled with a time-dependent scaling function according to an embodiment of the invention. FIG. 5(*c*) shows the raw signal data in FIG. 5(*a*) after it has been filtered with a time-dependent Gaussian filter function.

While improvements to the raw mass spectrum signal data shown in FIG. 5(*a*) are made by scaling or filtering alone, better signal data are produced when a time-dependent scaling function and a time-dependent filtering function are both used to process the signal data. For example, FIG. 5(*d*) shows the raw signal data in FIG. 5(*a*) after it has been both scaled with a time-dependent scaling function and filtered with a time-dependent, Gaussian filtering function. High frequency noise is removed, while scaling peaks in the signal data. As shown in FIG. 5(*d*), clearly identifiable peaks are present at m/z values above 100,000 Daltons. Such peaks do not appear to be readily discernable to the human eye in the graphs in FIGS. 5(*a*) to 5(*c*).

Embodiments of the invention provide a number of advantages. For example, in some embodiments of the invention, the peak heights in the digital signal data reflect the number of particles detected without a priori identification of the peaks. Peaks that might otherwise go undetected in the past can readily be identified using embodiments of the invention. Peak identification prior to scaling is not required in these embodiments. Moreover, the visual presentation of the peaks is markedly improved using embodiments of the invention. For example, as shown in FIG. 5(*d*), using embodiments of the invention, a user or a peak picking algorithm can readily identify analyte ion peaks in the signal data (e.g., above 100,000 Daltons) that might otherwise go unnoticed. Also, embodiments of the invention compensate for the time-dependent decrease in the probability of detecting high mass ions, and the time-dependent reduction in signal intensity for detected ions. This makes the processed data more informative to the user than the raw signal data that does not make such compensations. The peaks in the processed signal data generally have heights that are proportional to the amount of analyte ions being ionized. The relative heights of the peaks can accurately represent the relative amounts of ions at particular m/z values. Moreover, because the processing of the signal is performed by a digital computer, the processing of the signal can be easily changed without affecting the mass spectrometer hardware. Accordingly, embodiments of the invention are more easily designed, tested, implemented, optimized, or adjusted, than if the same functions were implemented in hardware.

A. Determining an Offset and Adjusting the Signal Data Using the Offset

In embodiments of the invention, a DC (direct current) offset can be determined for the digital signal data. The digital signal data can be adjusted using the determined DC offset. For example, after obtaining the digital signal data, the DC offset can be subtracted from the digital signal data.

Subtracting the DC offset from the digital signal data are desirable, since the inclusion of the DC offset can cause excessive scaling of the digital signal data when the scaling step is performed. For example, the DC offset for digital signal data may be 5 V. During the scaling step, data points forming peaks in the digital signal data may be multiplied to different values so that they are scaled in a time dependent manner. For instance, a time-dependent scaling function may scale data points forming two different peaks by 1V and 2V, respectively. The additional DC offset value for the digital signal data may cause data points forming the peaks to scale by 5V and 10V respectively, thus disproportionately scaling the data points forming the peaks. Accordingly, before scaling the two peaks by 1V and 2V, 5V may be subtracted from each data point in the digital signal data so that the DC offset for the digital signal data are essentially zero.

The DC offset for the digital signal data may be determined in any suitable manner. For example, in some embodiments, the signal offset may be determined by analyzing only the signal data in the last 50% or less of the time period over which the digital signal data are obtained. For example, the signal offset can be estimated using the average signal of the last 30% of the spectrum. It is believed that the digital signal data in the last 50% or less of the time period over which the digital signal data are obtained is more stable and has less fluctuations than the digital signal data in the first 50% of the time period over which the digital signal data are obtained. In the last 50% of the time period over which the digital signal is obtained, a baseline DC offset for the digital signal data can be determined, and this baseline DC offset can be subtracted from each data point of the digital signal data to remove the DC offset from the digital signal data. This particular process for determining the DC offset is relatively simple and can be implemented relatively quickly.

The determination of the appropriate DC offset could be easily improved. For example, average data points with signal greater than two standard deviations away from the mean could be excluded from the determination of the DC offset. Data points that are greater than two standard deviations from the mean may be produced by ions and can skew the DC offset upward. Removing such data points from the DC offset determination produces a more accurate DC offset.

B. Filtering the Signal Data

Time-of-flight mass spectrometers typically have several sources of signal noise including sampling noise, Johnson noise, flicker noise, and high frequency noise created by the detection apparatus. Noise is typically modeled as a wide bandwidth additive signal. Thus, the signal data can be described as desired signal data, which represents detection of ions generated from the sample, added with a wide bandwidth noise signal.

It is desirable to reduce the noise and increase the signal-to-noise ratio (SNR), thus, making the peaks in the digital signal data more discernable to the user. The bandwidth of the desired signal data are bandwidth limited while the noise signal is not. Therefore, by applying a bandwidth limiting filter to the signal data, the noise can be reduced while only minimally effecting the desired signal. Thus, applying a bandwidth limiting filter to the signal data increases the SNR of the signal data. Accordingly, in some embodiments, before or after the DC offset is determined and/or the digital signal data are adjusted with the determined DC offset, the digital signal data are filtered. As described above, such filtering may also be implemented, prior to digitizing the signal data, with an analog filter.

SNR can be defined as the peak height divided by the standard deviation of the noise. The area of a peak is proportional to the number of ions detected, so the peak heights for equal numbers of ions detected at different m/z values decrease with increasing m/z because the peak widths increase while the area of the peak is held constant. Additionally, it has been found that noise exhibited in mass spectrometers is not a strong function of m/z at high m/z. Since the peak height decreases with time, while the standard deviation of noise tends to remain unchanged, the SNR falls with increasing time.

As shown in the following table, ion populations with lower mass-to-charge ratio values produce detection signals that have comparatively higher frequency components than ions with larger mass-to-charge ratio values as shown in the following table that describes typical ion flight time, target resolution, and major frequency components (as determined by required peak width to obtain target resolution).

TABLE 1

| Mass-to-Charge Ratio (m/z) | Ion Flight Time (microseconds) | Major Component Frequency (MHz) | Peak Width At Half Height (microseconds) | Mass Resolution |
|---|---|---|---|---|
| 500 | 10.2 | 740 | 0.0010 | 5000 |
| 1,000 | 14.4 | 500 | 0.0016 | 4500 |
| 2,000 | 20.4 | 250 | 0.0034 | 3000 |
| 5,000 | 32.2 | 70 | 0.0134 | 1200 |
| 15,000 | 55.8 | 19 | 0.0254 | 1100 |
| 40,000 | 91.1 | 2 | 0.3037 | 150 |
| 150,000 | 176.3 | .290 | 1.7600 | 50 |
| 250,000 | 227.6 | .130 | 3.8000 | 30 |
| 500,000 | 321.9 | .063 | 8.0500 | 20 |

As described above, digital filtering can be applied to oversampled raw data to improve the SNR. Typically, a digital filter is a linear shift invariant system for computing a discrete output sequence form a discrete input sequence. Often, digital filtering is implemented by the convolution of a smoothing function (filter) with the signal data. As is well-known to those skilled in the art of digital signal processing, convolution can be implemented in time-space or frequency-space. Additionally, it is typically more computationally efficient to implement convolution in frequency-space. However, as is described below, in some embodiments of the invention, it appears to be more practical to perform the convolution of the filter with the signal data in time-space. Particularly, in some embodiments, a filter having a bandwidth that narrows with time is applied to the signal data.

A commonly used digital filter is a finite impulse response (FIR). The filtering of signal data with an FIR filter can be mathematically described as, $$y(n) = \sum_{k=-N_L}^{N_H} f(k)x(n-k), \tag{7}$$

where x(n) is the input data sequence to the digital filter, y(n) is the filtered data sequence, $f(-N_L), \ldots, f(N_H)$ are the filter coefficients, and $N_L+N_H+1$ is the width of the filter.

In the specific embodiment, a different filter is applied to obtain each filtered output value y(n). Thus, in this embodiment the signal data are filtered as, $$y(n) = \sum_{k=-N_L(n)}^{N_H(n)} f_n(k)x(n-k). \tag{8}$$

Here, $f_n$ is the digital filter applied to obtain the filtered output y(n), and $N_L(n)+N_H(n)+1$ is the width of the filter $f_n$. Each filter $f_n$ has a different bandwidth corresponding to the bandwidth of the data signal at that particular time, and each filter therefore has a different set of $N_L(n)+N_H(n)+1$ filter coefficients.

As described above, the SNR of the unfiltered signal data decreases with time because peak heights decrease with time while the standard deviation of noise remains constant. If the signal data are filtered with a filter having a constant bandwidth, the SNR of the signal data are increased overall. However, the SNR of the signal data still decreases with time. But, if a digital filter, whose bandwidth decreases with time to match the decreasing bandwidth of the signal, is applied to the signal data, then the SNR of the signal data can be increased and can also be made more constant with time.

In a specific embodiment, a Gaussian filter function is used to filter the digital signal data. The Gaussian filter results in a gradual pass band roll off and has a response curve (magnitude vs. frequency) that approximates an ideal Gaussian curve. The Gaussian distribution can be defined by the following equation.

$$G(t) = \frac{1}{\sigma\sqrt{2\pi}} e^{-\frac{(t-\mu)^2}{2\sigma^2}} \tag{9}$$

In the formula above, "σ" is the standard deviation, "t" is time, and "μ" is a constant. A gaussian filter whose bandwidth corresponds to the width of a peak in the data signal at half height is:

$$f_w(k) = \frac{.93943}{sw} e^{-\frac{(k-\mu)^2}{.3607 s^2 w^2}}, \tag{10}$$

for k=−int[w], . . . , −1, 0, 1, . . . int[w], where w is a measured or expected peak width, and where s is a constant that can be adjusted for a desired degree of smoothing. As will be described in more detail below, the expected peak width increases with time. Thus, referring to equation (8), equation (10) can be used to generate a different filter $f_n$ for each n.

Other details regarding filtering with filters whose bandwidths vary with time are described in U.S. Provisional Patent Application No. 60/134,072 filed May 13, 1999, and U.S. Non-Provisional U.S. patent application Ser. No. 09/569,158, filed May 11, 2000. Both of these U.S. patent applications are assigned to the same assignee as the present invention.

In the above-described embodiments, a different filter $f_n$ is applied to the signal data to obtain each filtered signal data y(n). However, in other embodiments, a first filter having a first bandwidth can be used to generate a first subset of filtered signal data, a second filter having a second bandwidth can be used to generate a second subset of filtered signal data, etc. The first bandwidth of the first filter can correspond to the bandwidth of a first subset of the unfiltered signal data, the second bandwidth of the second filter can correspond to the bandwidth of a second subset of the unfiltered signal data, etc. Additionally, it is to be understood that other types of filters besides a FIR filter can be used. For example, an infinite impulse response (IIR) filter, a non-linear filter, etc., can also be used.

C. Scaling the Signal Data

As previously explained for a given TOF geometry and acceleration potential, low molecular weight ions have shorter times of flight than larger molecular weight ions. Therefore, low molecular weight ions impact the ion detector before larger molecular weight ions. Ion detection signal scaling preferably increases for higher molecular weight ions to compensate for the fact that higher molecular weight ions possess comparatively diminished detection efficiency with respect to low m/z ions. In embodiments of the invention, signal intensity scaling generally increases as a function of time. Thus, as the molecular weights of ions striking the ion detector increase, the digital computer scales the signal more.

The digital signal data may be scaled by any suitable amount using a time-dependent scaling function. Data points forming the peaks in the digital signal data are scaled using the time-dependent scaling function so that the scaled intensity values increase as function of time. The peaks can be scaled so that the heights of the peaks are proportional to the quantity of ions that are detected.

The digital signal data may be scaled using any suitable process. Suitable time-dependent scaling functions can be proportional to time. In some embodiments, the time-dependent scaling function can be proportional to the square of time, or the cube of time. Moreover, the time-dependent scaling function can include a step function. For example, the scaling function can increase stepwise in at least one step so that sets of peaks in the digital signal data are scaled according to discrete values. For instance, in some embodiments, specific ranges of time-of-flight values could be multiplied by scaling factors that are specific for those ranges. An example of an embodiment of this type is described below. However, in other embodiments, the time-dependent scaling function can be a continuous function.

In some embodiments, the digital signal data may be scaled using an expected peak dimension such as expected or measured peak widths. In other embodiments, the digital signal data may be scaled using the ion conversion efficiency in the system as a function of particle impact velocity. In yet other embodiments, the digital signal data may be scaled using the relative detection efficiencies of the mass spectrometer as calculated using various test compounds. Further details about each of these exemplary scaling process examples are provided below.

In some embodiments of the invention, the expected peak widths may be used to scale the signal data. First, the expected peak width value at a particular time-of-flight value (or a value derived from a time-of-flight value such as an m/z value) can be determined. An "expected" peak width for a peak can be the width of a peak in a mass spectrum that is predicted to be produced at a given time-of-flight value (or value derived from a time-of-flight value) by the mass spectrometer that is currently being used for a given number of ions. In general, the expected peak widths increase as m/z values or time-of-flight values increase.

The expected peak width can be the expected width at any suitable point along the height of a peak. In some embodiments, the expected peak width may be the expected width of the base of a peak, or at a point between the apex and base of each peak. For instance, the peak widths that are used may be the peak widths at half the height of each peak. In another example, for a series of peaks in a mass spectrum signal, the expected peak widths can be at a point between the apex and the base of each peak at the same distance from the baseline forming the bases of the peaks. In both cases, the expected peak width generally increases as the m/z values increase.

The expected peak widths can be theoretically or empirically derived. For example, a mass spectrum signal with a number of peaks corresponding to different analytes with known m/z values can be created, wherein the number of each of the different analytes is known to be approximately the same. The average time-of-flight value associated with each peak and the width of the peak can be recorded in a table of expected peak widths using analytes with known m/z values. An exemplary table of expected peak widths is shown in Table 3.

TABLE 3

Table of Expected Peak Widths

| Time-of-flight (microseconds) | Expected Peak Width (nanoseconds) |
|---|---|
| 0 | 4 |
| 60 | 80 |
| 94 | 600 |
| 132 | 2000 |
| 188 | 4000 |

Using the values in Table 3, a best-fit curve can be created to fit the values in Table 3 and the function forming the curve can be used to scale the signal data. Alternatively, linear interpolation can be used to form a linear function that represents the data. In each of these embodiments, the intensity values associated with data points corresponding to higher time-of-flight values would be increased more than the intensity values corresponding to lower time-of-flight values.

The determined expected peak width value could then be used to adjust the intensity value at the time-of-flight value. When the expected peak width is used to scale the intensity, the resulting peak heights in the processed signal data become proportional to the number of detected particles for each of the peaks. The relative heights of the peaks can accurately represent the relative amounts of analytes within a particular sample being ionized.

The signal intensity value corresponding to that data point may then be scaled in an amount proportional to the expected peak width value for that data point. For instance, referring to Table 3 above, each data point in the digital signal data can be scaled as follows: from 0 to 60 microseconds, each data point is scaled by 4; from above 60 to 94 microseconds, each data point is scaled by 80; from above 94 to 132 microseconds, each data point is scaled by 600; from above 132 microseconds to 188 microseconds, each data point is scaled by 2000; and above 188 microseconds, each data point is scaled by 4000. The values 4, 80, 60, 2000, and 4000 can be considered scaling factors the proportionally scale data points forming peaks. The absolute scaling values may be determined by the user if desired.

In some embodiments, the signal intensity value corresponding to a data point may be multiplied by an amount equal to about "1.00+expected peak width" to produce a scaling factor. If the expected peak width at a data point is zero, the intensity value that is associated with that data point is multiplied by 1.0 so that it is not scaled. The data point may even be scaled by an additional "intensity factor" that is input by the user to adjust the degree of scaling even further if even greater peak differentiation is desired by the user. In these embodiments, each data point may be amplified by an amount equal to about "1.00+expected peak width*intensity factor".

Peaks in the digital signal data may also be scaled using peaks widths that are determined from a set of peaks in the time-dependent digital signal data. That is, peak width information in the obtained digital signal data that is to be scaled can be used to scale the peaks in the digital signal data. In these embodiments, the peaks in the digital signal data are identified before scaling takes place. In a typical example, a set of peaks can first be identified in the digital signal data using any number of known techniques. After the peaks are identified, peak widths can be determined for each of the peaks in the set of peaks. After determining the peak widths for the peaks in the set, the respective peaks can be scaled based on their respective measured peak widths.

Figure 1A:
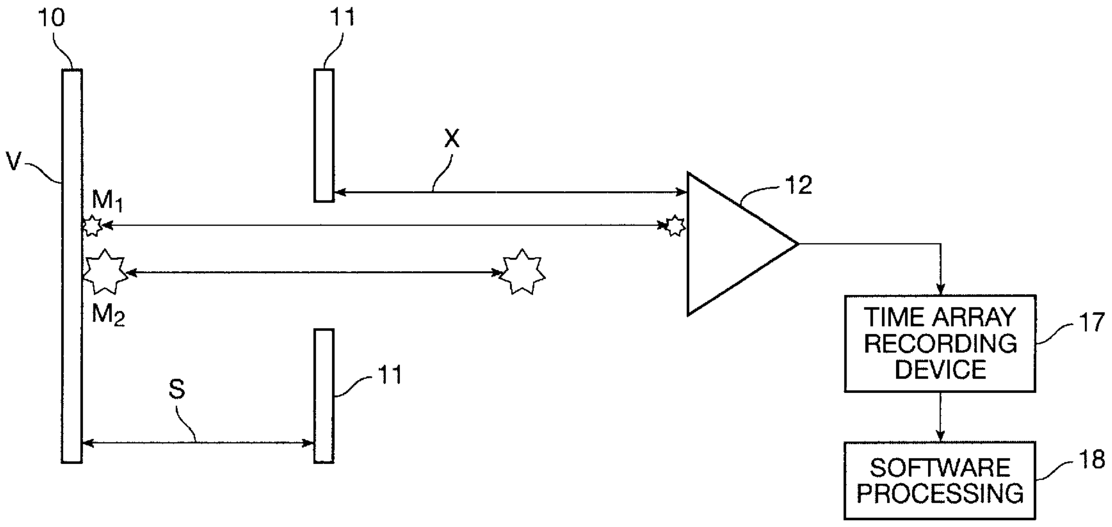
FIG. 1A shows a schematic diagram of a time-of-flight mass spectrometer.
Figure 1B:
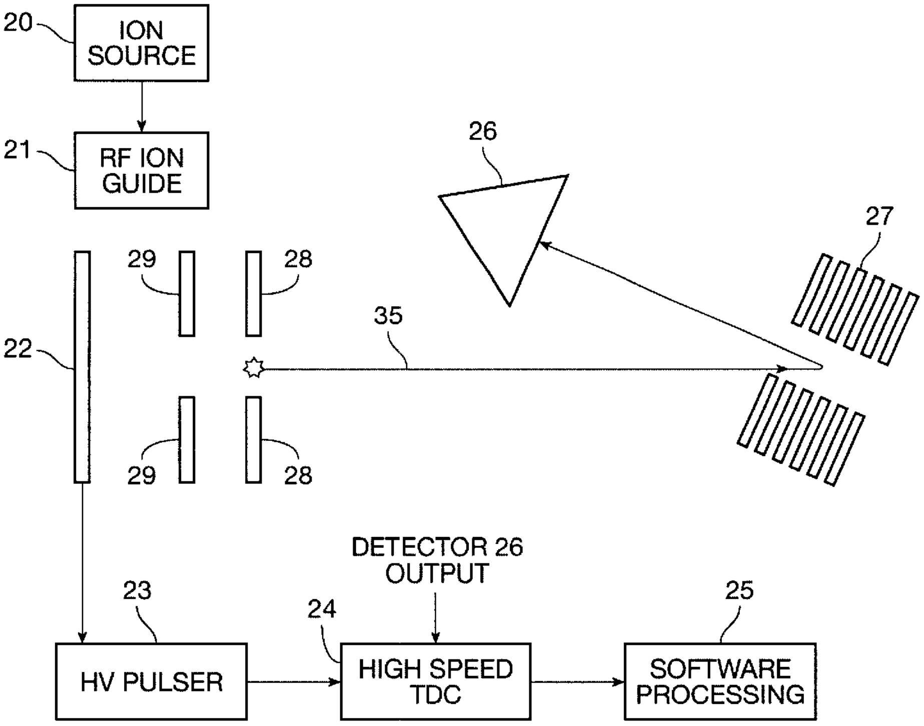
FIG. 1B shows a schematic diagram of an orthogonal extraction time-of-flight mass spectrometer.
Figure 2:
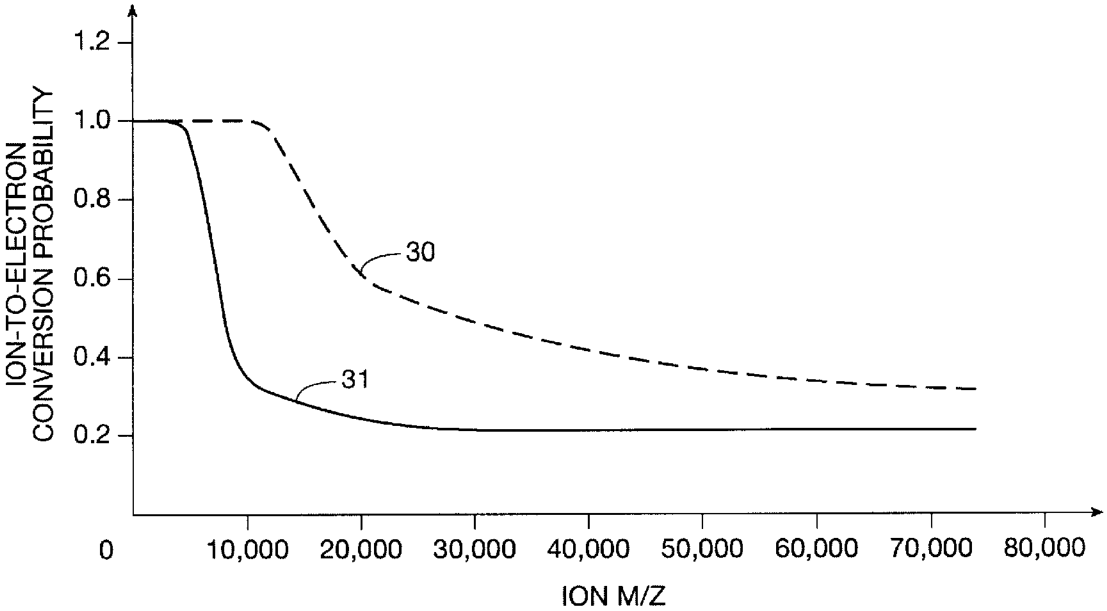
FIG. 2 shows a graph of the ion-to-electron conversion probability for ions with different mass-to-charge ratio values at 25 and 50 KeV of total kinetic energy.
Figure 6:
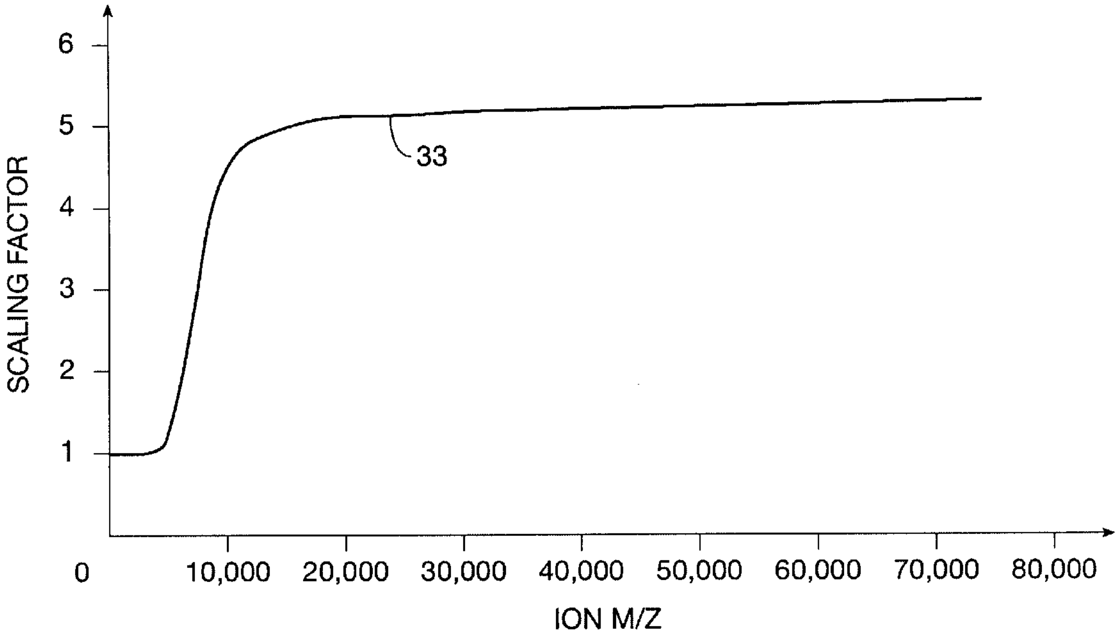
FIG. 6 shows a graph of scaling factor vs. ion m/z.
Figure 5A:
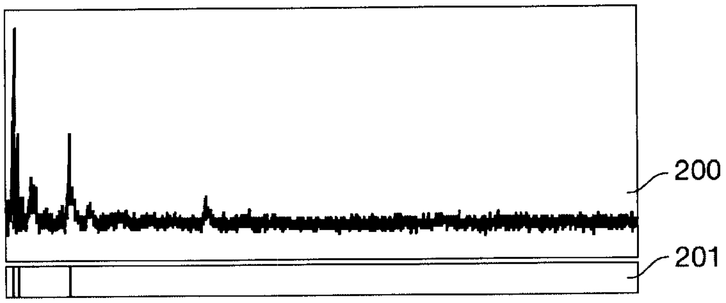
FIG. 5(*a*) shows a signal that is indicative of mass-to-charge ratio values of ions that impact a surface of an ion detector over a time period.
Figure 5B:
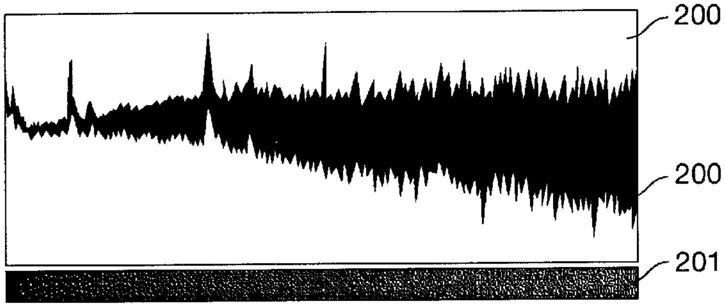
Figure 5C:
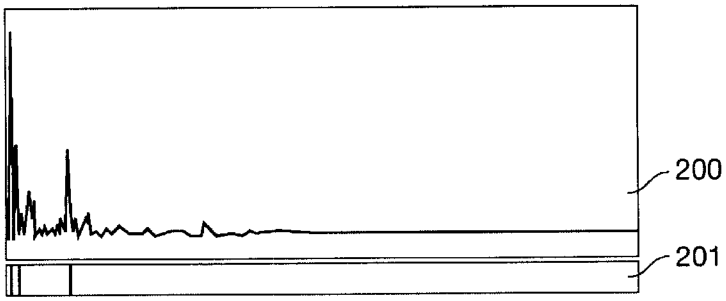
Figure 5D:
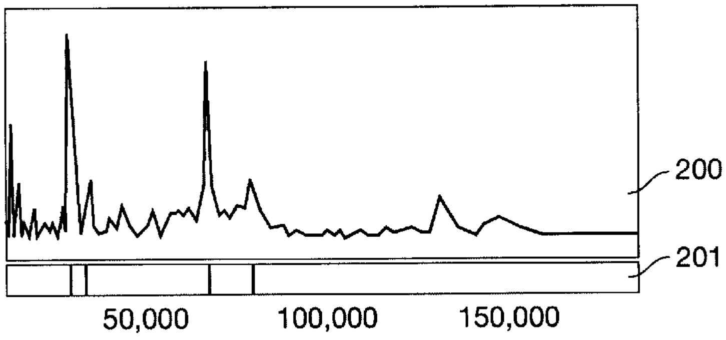

Peaks in the digital signal data may additionally be scaled based on the ion conversion efficiency in the system as a function of particle impact velocity. As noted above, the particle impact velocity is proportional to the ion m/z values. The ion conversion efficiency of a detector as a function of particle impact velocity (or ion m/z) could be determined by experiment. Such an experiment would be done by comparison with a cryogenically operated phonon-detecting ion detector. The inverse function could be used to scale the digital signal data as a function of time-of-flight. For example, as shown in FIG. 6, the curve 33 is an inverted curve of curve 31 in FIG. 2. The curve in FIG. 6 can be used to identify an appropriate scaling amount for a given m/z value and compensates for changes in the ion conversion efficiency as the m/z values of the ions increase. As shown in FIG. 6, a scaling factor with a greater magnitude is used for ions with high m/z values than for ions with low m/z values.

Peaks in the digital signal data may also be scaled based on the relative detection efficiency of the instrument. The relative detection efficiency of the instrument may be empirically derived using various test compounds. Using the test compounds, the detection efficiency of the instrument as a function of m/z may be determined. For example, a mass spectrum signal including a number of peaks corresponding to known analyte ions with different m/z values and in known quantity may be formed. The detection efficiencies of the mass spectrometer at each of the m/z values can be determined. A function of detection efficiency vs. m/z value can be created using the determined detection efficiencies. The inverse of this function could then be used to scale data points in the signal data.

Any of the above-described steps can be embodied by any suitable computer code that can be executed by any suitable computational apparatus, such as, for example, a microprocessor, a DSP, etc. The computational apparatus may be incorporated into the mass spectrometer or may be separate from and operatively associated with the mass spectrometer. Any suitable computer readable media including, for example, magnetic, electronic, or optical disks or tapes, flash memory, etc. can be used to store the computer code. The code may also be written in any suitable computer programming language including, for example, Fortran, Pascal, C, C++, assembly language, etc. Accordingly, embodiments of the invention can be automatically performed without significant intervention on the part of the user.

Appendix A contains source code that provides an example of code for processing digital signal data in a time-of-flight mass spectrometry process in accordance with an embodiment of the invention. The source code is written in C++.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed. Moreover, any one or more features of any embodiment of the invention may be combined with any one or more other features of any other embodiment of the invention, without departing from the scope of the invention.

All publications and patent documents cited in this application are incorporated by reference in their entirety for all purposes to the same extent as if each individual publication or patent document were so individually denoted. By their citation of various references in this document Applicants do not admit that any particular reference is "prior art" to their invention.

10193349 .071002

PATENT

Attorney Docket No.: 016866-007310US

APPENDIX

```
#include <iostream.h>
#include <fstream.h>
#include <math.h>

void main()
{

        int dRecordCounter = 0;
        double dMZ = 1.0;
        double dIntensity = 0.0;
        double dPeakWidth = 1.0;
        double dFwhm = 1.0;
        double dSmoothingFraction = 0.2;
        double dEnhancementFactor = 1.0;
        double B = 0.0;
        double offset = 0.0;

        //expected peak width in data bins @ 4 ns per bin
        //bin #                 Peak W
        //    0 (  0 us)         1 (  4 ns)
        //15000 ( 60 us)        20 ( 80 ns)
        //23000 ( 94 us)       150 (600 ns)
        //33000 (132 us)        500 (  2 us)
        //47000 (188 us)       1000 (  4 us)

        //table of expected peak widths
        const double dTableTOF1 = 0.0;
        const double dTableTOF2 = 15000.0;
```

10193349.071002

```
const double dTableTOF3 = 23000.0;
const double dTableTOF4 = 33000.0;
const double dTableTOF5 = 47000.0;
const double dPeakW1 = 1.0;
const double dPeakW2 = 20.0;
const double dPeakW3 = 150.0;
const double dPeakW4 = 500.0;
const double dPeakW5 = 1000.0;
int t = 0;
int index = 0;
int bin = 0;
int update = 0;
int updateincrement = 1;
double dSmoothed = 0.0;

//declare and open input file streams
ifstream fsMZ;
fsMZ.open ("input.txt");
ofstream fsSmoothed;
fsSmoothed.open ("output.txt");
fsSmoothed.clear();

//get user input for degree of smoothing and enhancement
cout << "Enter Smoothing Fraction of Expected Peak Width: ";
cin >> dSmoothingFraction;
cout << endl;
cout << "Enter Intensity Enhancement Factor: ";
cin >> dEnhancementFactor;
cout << endl;

//count number of records in input file
while (fsMZ)
{
        fsMZ.ignore(200, '\n');
        dRecordCounter++;
}

fsMZ.close();
updateincrement = dRecordCounter/10000 * 50;
if (updateincrement < 10) updateincrement = 10;

//declare arrays for m/z data and intensity data
double* arrIntensity = new double[dRecordCounter+1];
fsMZ.open( "input.txt" );

for(int iCounter = 0; iCounter <= dRecordCounter; iCounter++)
{
        fsMZ >> dMZ;
        fsMZ >> dIntensity;
        arrIntensity[iCounter] = dIntensity;
}

fsMZ.close();

//find baseline
for( int cnt = (int)(.7*dRecordCounter); cnt <= dRecordCounter; cnt++) offset +=
arrIntensity[cnt];
offset /= (dRecordCounter-(int)(.7*dRecordCounter));
cout << offset <<endl;

//process spectrum
for( cnt = 0; cnt <= dRecordCounter; cnt++)
{
        double y1 = 0.0;
        double y2 = 0.0;
        double x1 = 0.0;
        double x2 = 0.0;

        //calculate expected peak width (fwhm)
        if(cnt <= dTableTOF2)
```

10193349.071002

```
{
        y1 = dPeakW1;
        y2 = dPeakW2;
        x1 = dTableTOF1;
        x2 = dTableTOF2;
}
else if(cnt > dTableTOF2 && cnt <= dTableTOF3 )
{
        y1 = dPeakW2;
        y2 = dPeakW3;
        x1 = dTableTOF2;
        x2 = dTableTOF3;
}
else if( cnt > dTableTOF3 && cnt <= dTableTOF4 )
{
        y1 = dPeakW3;
        y2 = dPeakW4;
        x1 = dTableTOF3;
        x2 = dTableTOF4;
}
else
{
        y1 = dPeakW4;
        y2 = dPeakW5;
        x1 = dTableTOF4;
        x2 = dTableTOF5;
}

double dSlope = 0.0;
dSlope = (y2-y1) / (x2-x1);
double dIntercept = 0.0;
dIntercept = y1 - dSlope * x1;
dPeakWidth = dSlope * cnt + dIntercept;

//calculate width of smoothing function (fwhm)
dFwhm = dPeakWidth * dSmoothingFraction;
if (dFwhm < 1.0) dFwhm = 1.0;

//apply point-by-point convolution of signal with smoothing function
B = 1.0 / ( 0.3607 * dFwhm*dFwhm);
bin = cnt;
for (t = (int)(cnt - 1.5 * dFwhm); t <= (int)(cnt + 1.5 * dFwhm); t++)  // 3*fwhm
gives 99% area under Gaussian)
{
        // don't fall off the end of the spectrum
        index = t;
        if (t>dRecordCounter)
        {
                bin--;
                index = bin;
        }
        else if(t<0)
        {
                bin++;
                index = bin;
        }
        // center smoothing function on a point in the spctrum and
        // then multiply the smoothing function intensity by the corresponding
        // raw data intensity.  Sum inside the loop.  Normalize later since
        // the normalization factor for a Gaussian is not 'bin number' dependent.
        dSmoothed += (arrIntensity[index]-offset) * exp (-B * (t-cnt)*(t-cnt));
//Gaussian smoothing function
}
// Normalize.  Multiply Gaussian by .93943/dFwhm so (area in) = (area out)
// Could combine w/ scaling step to minimize computation.
dSmoothed *= .93943/dFwhm;
// Apply time dependent scaling.
// Could use 1/(expected detection efficiency).
// Used expected peak width for simplicity in demo.
// Defined so '0 Enhancement' yields no change in smoothed spectrum.
```

10193349.071002

```
            dSmoothed *= 1+dEnhancementFactor*dPeakWidth;
            // convert to int to accomodate data display program import requirement
            fsSmoothed << (int)(1000*dSmoothed) << endl;
            dSmoothed = 0.0;
            // display progress
            if (cnt==update)
            {
                    cout << cnt <<endl;
                    update += updateincrement;
            }
    }

    //close files
    fsSmoothed.close();
    //delete new array
    delete[] arrIntensity;
}
```

What is claimed is:

1. A method for digitally processing time-dependent signal data, the method comprising:

(a) receiving the time-dependent signal data in memory, wherein the time-dependent signal data represent a time-dependent signal, and wherein the time-dependent signal data include representations of time-of-flight values of ions, or values derived from time-of-flight values of ions; and (b) scaling the time-dependent signal data with a time-dependent scaling function.

2. The method of claim 1, wherein the method further comprises, before (a), digitizing the time-dependent signal to produce the time-dependent signal data.

3. The method of claim 1, wherein the method further comprises, before (a), producing the time-dependent signal using a time-of-flight mass spectrometer.

4. The method of claim 1 wherein the time-dependent scaling function is proportional to time.

5. The method of claim 1 wherein the time-dependent scaling function is proportional to the square of time.

6. The method of claim 1 wherein the time-dependent scaling function is proportional to the cube of time.

7. The method of claim 1 wherein the time-dependent scaling function includes a step function.

8. The method of claim 1 wherein the time-dependent scaling function is based on a signal bandwidth.

9. The method of claim 1 wherein the time-dependent signal is produced by a time-of-flight mass spectrometer, and wherein the time-dependent signal data include a set of peaks that are respectively associated with different time-of-flight values, or values derived from time-of-flight values, and wherein the time-dependent scaling function scales the peaks in the set of peaks using expected widths of peaks at the time-of-flight values, or values derived from time-of-flight values.

10. The method of claim 1 wherein the time-dependent signal is produced by a time-of-flight mass spectrometer, and wherein the time-dependent signal data include a set of peaks that are respectively associated with different time-of-flight values, or values derived from time-of-flight values, and wherein the time-dependent scaling function scales the peaks in the set of peaks using measured widths of peaks at the time-of-flight values, or values derived from time-of-flight values.

11. The method of claim 1 wherein the time-dependent signal data is from a time-of-flight mass spectrometer that comprises an ion detector that exhibits decreasing conversion efficiency as a function of increasing mass-to-charge ratio, and wherein the time-dependent scaling function is based on the conversion efficiency.

12. The method of claim 1 wherein the time-dependent signal is produced by a mass spectrometer and the mass spectrometer is a laser desorption/ionization mass spectrometer.

13. The method of claim 1 further comprising determining and subtracting an offset from the time-dependent signal data.

14. The method of claim 1 further comprising determining and subtracting an offset from the time-dependent signal data, and wherein determining and subtracting an offset is performed before (b).

15. The method of claim 1 further comprising digitally filtering the time-dependent signal data with a filter having a time-dependent bandwidth.

16. The method of claim 1 further comprising determining and subtracting an offset from the time-dependent signal data, wherein determining the offset includes analyzing only the time-dependent signal data in the last 50% or less of a time period over which the time-dependent signal is measured.

17. The method of claim 1 further comprising digitally filtering the time-dependent signal data with a filter, wherein coefficients of the filter are based on a Gaussian function.

18. The method of claim 1 further comprising digitally filtering the time-dependent signal data, wherein digitally filtering includes:

(i) producing a first subset of filtered data using a first filter having a first bandwidth; and (ii) producing a second subset of filtered data using a second filter having a second bandwidth.

19. A computer readable medium comprising:

(a) code for receiving time-dependent signal data in memory, wherein the time-dependent signal data represent a time-dependent signal, and wherein the time-dependent signal data include representations of time-of-flight values of ions, or values derived from time-of-flight values of ions; and (b) code for scaling the time-dependent signal data with a time-dependent scaling function.

20. The computer readable medium of claim 19 wherein the time-dependent scaling function is proportional to time.

21. The computer readable medium of claim 19 wherein the tune-dependent scaling function is proportional to the square of time.

22. The computer readable medium of claim 19 wherein the time-dependent scaling function is proportional to the cube of time.

23. The computer readable medium of claim 19 wherein the time-dependent scaling function includes a step function.

24. The computer readable medium of claim 19 wherein the time-dependent scaling function is based on a signal bandwidth.

25. The computer readable medium of claim 19 wherein the time-dependent signal is produced by a time-of-flight mass spectrometer, and wherein the time-dependent signal data include a set of peaks that are respectively associated with different time-of-flight values, or values derived from time-of-flight values, and wherein the time-dependent scaling function scales the peaks in the set of peaks using expected widths of peaks at the time-of-flight values, or values derived from time-of-flight values.

26. The computer readable medium of claim 19, wherein the time-dependent signal is produced by a time-of-flight mass spectrometer, and wherein the time-dependent signal data include a set of peaks that are respectively associated with different time-of-flight values, or values derived from time-of-flight values, and wherein the time-dependent scaling function scales the peaks in the set of peaks using measured widths of peaks at the time-of-flight values, or values derived from time-of-flight values.

27. The computer readable medium of claim 19 wherein the time-dependent signal is from a time-of-flight mass spectrometer that comprises an ion detector that exhibits decreasing conversion efficiency as a function of increasing mass-to-charge ratio, and wherein the time-dependent scaling function is based on the conversion efficiency.

28. The computer readable medium of claim 19 wherein the time-dependent signal is produced by a mass spectrometer and the mass spectrometer is a laser desorption/ionization mass spectrometer.

29. The computer readable medium of claim 19 further comprising code for determining and subtracting an offset from the time-dependent signal data.

30. The computer readable medium of claim 19 further comprising code for digitally filtering the data with a filter having a time-dependent bandwidth.

31. The computer readable medium of claim 19 further comprising code for determining and code for subtracting an offset from the time-dependent signal data, wherein the code for determining the offset includes code for analyzing only the time-dependent signal data in the last 50% or less of a time period over which the time-dependent signal is measured.

32. The computer readable medium of claim 19 further comprising code for digitally filtering the data with a filter, wherein coefficients of the filter are based on a Gaussian function.

33. The computer readable medium of claim 19 further comprising code for digitally filtering the time-dependent signal data, wherein the code for digitally filtering includes:

(i) code for producing a first subset of filtered data using a first filter having a first bandwidth; and (ii) code for producing a second subset of filtered data using a second filter having a second bandwidth.

34. A mass spectrometer system comprising:

(a) an ionization source that generates ions;

(b) a mass analyzer that receives the ions from the ionization source, and focuses and accelerates the ions using electrostatic fields toward an ion detector;

(c) an ion detector with a detecting surface that detects the ions and produces a time-dependent signal;

(d) a digital converter adapted to convert the time-dependent signal from the ion detector into time-dependent signal data;

(e) a digital computer including a memory, the digital computer configured to process the time-dependent signal data according to the steps of:

(i) receiving the time-dependent signal data in the memory, wherein the time-dependent signal includes representations of the time-of-flight values of the ions, or values derived from time-of-flight values of the ions, and (ii) scaling the time-dependent signal data with a time-dependent scaling function.

35. The mass spectrometer system of claim 34 wherein the mass spectrometer system includes a time-of-flight mass spectrometer.

36. The mass spectrometer system of claim 34 wherein the scaling function is proportional to time.

37. The mass spectrometer system of claim 34 wherein the scaling function is proportional to the square of time.

38. The mass spectrometer system of claim 34 wherein the scaling function is proportional to the cube of time.

39. The mass spectrometer system of claim 34 wherein the scaling function increases stepwise in at least one step.

40. The mass spectrometer system of claim 34 wherein the time-dependent scaling function is based on a signal bandwidth.

41. The mass spectrometer system of claim 34 wherein the time-dependent signal data include a set of peaks that are respectively associated with different time-of-flight values, or valves derived from time-of-flight values, and wherein the time-dependent scaling function scales the peaks in the set of peaks using expected widths of peaks at the time-of-flight values, or values derived from time-of-flight values.

42. The mass spectrometer system of claim 34 wherein the time-dependent signal data include a set of peaks that are respectively associated with different time-of-flight values, or values derived from time-of-flight values, and wherein the time-dependent scaling function scales the peaks in the set of peaks using measured widths of peaks at the time-of-flight values, or values derived from time-of-flight values.

43. The mass spectrometer system of claim 34 wherein the ion detector exhibits decreasing conversion efficiency as a function of increasing mass-to-charge ratio, and wherein the time-dependent scaling function is based on the conversion efficiency.

44. The mass spectrometer system of claim 34 wherein the mass spectrometer system includes a laser desorption/ionization mass spectrometer.

45. The mass spectrometer system of claim 34 wherein the digital computer is further configured to process the time-dependent signal data according to the steps of determining and subtracting an offset from the time-dependent signal data.

46. The mass spectrometer system of claim 34 wherein determining the offset includes analyzing only the time-dependent signal data in to last 50% or less of a time period over which the time-dependent signal is measured.

47. The mass spectrometer of system claim 34 wherein the digital computer is further configured to process the time-dependent signal data according to the step of digitally filtering the data with a filter having a time-dependent bandwidth.

48. The mass spectrometer system of claim 34 wherein digitally filtering the data with a filter having a time-dependent bandwidth includes:

(i) producing a first subset of filtered data using a first filter having a first bandwidth; and (ii) producing a second subset of filtered data using a second filter having a second bandwidth.

49. The mass spectrometer system of claim 34 wherein the digital computer is further configured to process the time dependent signal data according to the steps of digitially filtering the data with a filter, wherein coefficients of the filter are based on a Gaussian function.

* * * * *